United States Patent
Asano et al.

(10) Patent No.: US 10,505,220 B2
(45) Date of Patent: Dec. 10, 2019

(54) NEGATIVE ELECTRODE ACTIVE MATERIAL FOR RECHARGEABLE BATTERY USING CONVERSION REACTION, AND BATTERY INCLUDING THE SAME

(71) Applicant: Panasonic Intellectual Property Management Co., Ltd., Osaka (JP)

(72) Inventors: Kazuko Asano, Osaka (JP); Akira Kano, Osaka (JP); Kensuke Nakura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 42 days.

(21) Appl. No.: 16/008,026

(22) Filed: Jun. 14, 2018

(65) Prior Publication Data
US 2019/0006705 A1    Jan. 3, 2019

(30) Foreign Application Priority Data
Jun. 29, 2017    (JP) .................................. 2017-127035

(51) Int. Cl.
| | | |
|---|---|---|
| *H01M 10/0525* | (2010.01) | |
| *H01M 10/0569* | (2010.01) | |
| *H01M 4/505* | (2010.01) | |
| *H01M 4/525* | (2010.01) | |
| *H01M 4/66* | (2006.01) | |
| *H01M 2/14* | (2006.01) | |
| *H01M 4/02* | (2006.01) | |

(52) U.S. Cl.
CPC ......... *H01M 10/0525* (2013.01); *H01M 2/14* (2013.01); *H01M 4/505* (2013.01); *H01M 4/525* (2013.01); *H01M 4/661* (2013.01); *H01M 10/0569* (2013.01); *H01M 2004/027* (2013.01); *H01M 2004/028* (2013.01)

(58) Field of Classification Search
CPC ......... H01M 10/0525; H01M 10/0569; H01M 2004/027; H01M 2004/028; H01M 2/14; H01M 4/505; H01M 4/525; H01M 4/661; C01G 3/00; C01G 45/00; C01G 49/00; C01G 51/00; C01G 53/00; C01P 2006/40
See application file for complete search history.

(56) References Cited

U.S. PATENT DOCUMENTS

| | | |
|---|---|---|
| 2008/0286652 A1 | 11/2008 | Nazri et al. |
| 2013/0108924 A1 | 5/2013 | Nakayama et al. |
| 2013/0202969 A1 | 8/2013 | Matsunaga et al. |

FOREIGN PATENT DOCUMENTS

| | | |
|---|---|---|
| JP | 2012-038697 | 2/2012 |
| JP | 2012-094336 | 5/2012 |
| JP | 2015-187970 | 10/2015 |
| WO | 2012/008206 | 1/2012 |

*Primary Examiner* — Carlos Barcena
(74) *Attorney, Agent, or Firm* — McDermott Will & Emery LLP

(57) ABSTRACT

A negative electrode active material includes a compound represented by a composition formula of $Mg_xMe_{1-x}O_{1-x}H_{2x}$, where Me is at least one selected from the group consisting of Mn, Fe, Co, Ni, and Cu, and $0.5 \leq x \leq 0.9$.

6 Claims, 1 Drawing Sheet

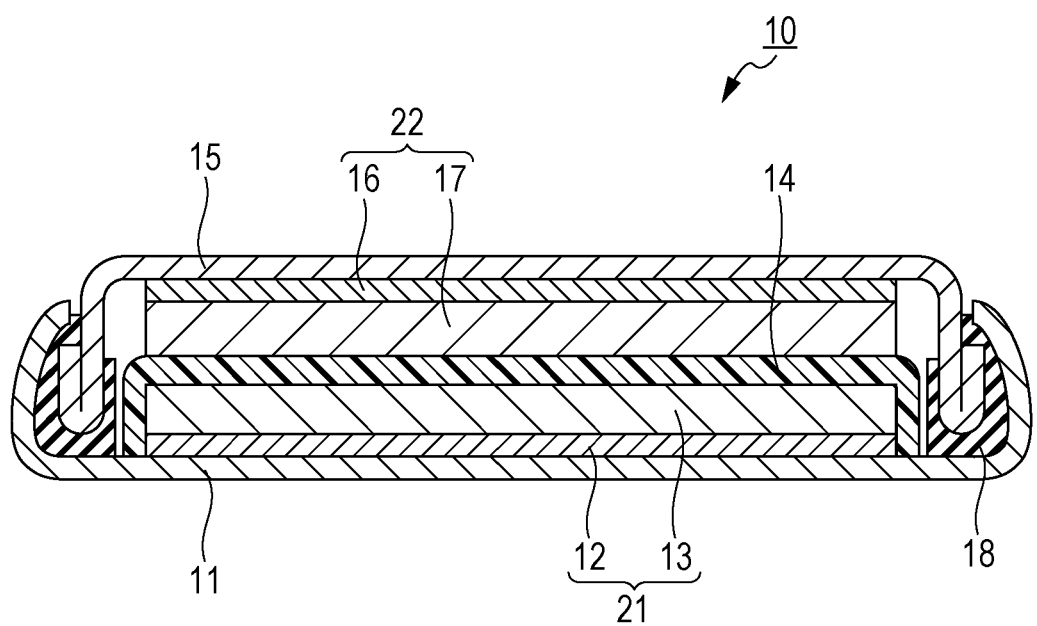

NEGATIVE ELECTRODE ACTIVE MATERIAL FOR RECHARGEABLE BATTERY USING CONVERSION REACTION, AND BATTERY INCLUDING THE SAME

BACKGROUND

1. Technical Field

The present disclosure relates to a negative electrode active material and a battery comprising a negative electrode which includes the negative electrode active material.

2. Description of the Related Art

In recent years, as a power storage device having a high energy density, a nonaqueous electrolyte secondary battery has been practically used. For example, a lithium ion secondary battery has drawn attention not only as a power source of a mobile device but also as a storage battery to be used for a hybrid car, an electric car, a household power storage device, or the like, and development of the secondary battery described above has been carried out.

Heretofore, for example, as a negative electrode active material to be used for a negative electrode of a lithium ion secondary battery, various materials have been proposed. Negative electrode active materials which have been widely used are materials each occluding and releasing lithium by an intercalation reaction. However, in order to increase the energy density, a negative electrode active material occluding and releasing lithium by a conversion reaction has been proposed. For example, U.S. Pat. No. 7,736,805 has proposed hydrides, such as $MgH_2$, $TiH_2$, and $NaH_2$, as a negative electrode active material capable of occluding and releasing lithium by a conversion reaction.

SUMMARY

In one general aspect, the techniques disclosed here feature a negative electrode active material which comprises: a compound represented by a composition formula of $Mg_xMe_{1-x}O_{1-x}H_{2x}$, where Me is at least one selected from the group consisting of Mn, Fe, Co, Ni, and Cu, and $0.5 \leq x \leq 0.9$.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWING

FIGURE is a cross-sectional view schematically showing one example of the structure of a battery according to a second embodiment.

DETAILED DESCRIPTION

Hereinafter, a process of obtaining a negative electrode active material according to the present disclosure will be described.

U.S. Pat. No. 7,736,805 has disclosed hydrides, such as $MgH_2$, $TiH_2$, and $NaH_2$, as a negative electrode active material occluding and releasing lithium by a conversion reaction. However, through detailed research carried out by the present inventors, it was found that in a lithium ion secondary battery using this negative electrode active material, although the hysteresis is small, the charge/discharge efficiency is disadvantageously low.

The present inventors performed intensive research primarily focusing on the problem described above, and as a result, the negative electrode active material according to the present disclosure was finally obtained.

Aspects of Present Disclosure

A negative electrode active material according to a first aspect of the present disclosure is a negative electrode active material which comprises a compound represented by the following composition formula (1).

$$Mg_xMe_{1-x}O_{1-x}H_{2x} \quad (1)$$

In the formula (1), Me is at least one selected from the group consisting of Mn, Fe, Co, Ni, and Cu, and $0.5 \leq x \leq 0.9$ is satisfied. In the case where Me includes two or more selected from the above group, the compound may be a solid solution.

According to the negative electrode active material of the first aspect, a battery having a high charge/discharge efficiency can be realized.

In a second aspect, for example, in the above composition formula (1) of the negative electrode active material according to the first aspect, $0.7 \leq x \leq 0.9$ may also be satisfied.

According to the negative electrode active material of the second aspect, a battery having a higher capacity and a higher charge/discharge efficiency can be realized.

In a third aspect, for example, the above compound in the negative electrode active material according to the first aspect or the second aspect may be a finely pulverized compound which is composited from $MgH_2$ and MeO using a mechanochemical method.

According the negative electrode active material of the third aspect, the stability of the compound represented by the above composition formula (1) contained in the negative electrode active material can be enhanced.

A battery according to a fourth aspect of the present disclosure comprises: a negative electrode including the negative electrode active material according to any one of the first to the third aspects; a positive electrode; and an electrolyte.

Since the battery according to the fourth aspect comprises the negative electrode which includes the negative electrode active material according to any one of the first to the third aspects, a high charge/discharge efficiency can be realized.

Embodiments

Hereinafter, embodiments of the present disclosure will be described in detail. The following embodiments are described by way of example, and the present disclosure is not limited thereto.

First Embodiment

In a first embodiment, an embodiment of a negative electrode active material according to the present disclosure will be described.

The negative electrode active material of this embodiment contains a compound represented by the following composition formula (1).

$$Mg_xMe_{1-x}O_{1-x}H_{2x} \quad (1)$$

In the above composition formula (1), Me is at least one selected from the group consisting of Mn, Fe, Co, Ni, and Cu, and 0.5≤x≤0.9 is satisfied.

Since the negative electrode active material of this embodiment contains the compound represented by the composition formula (1), a battery having a high charge/discharge efficiency can be realized.

In addition, according to the negative electrode active material of this embodiment, since a battery performing charge/discharge by a conversion reaction is realized, a battery in which the energy density is increased, that is, a battery having a high capacity, can be realized. In addition, according to the negative electrode active material of this embodiment, in the above composition formula (1), x is 0.5 or more. Since x is set to 0.5 or more, the problem in that since an equilibrium potential is increased, a Li amount of the negative electrode active material to be used in an operation potential region is decreased can be suppressed from being generated. By the reason as described above, the negative electrode active material of this embodiment can also realize a battery having a high capacity. As described above, according to the negative electrode active material of this embodiment, besides the improvement in charge/discharge efficiency, the increase in capacity of the battery can also be realized.

Hereinafter, as for the negative electrode active material of this embodiment, a charge/discharge mechanism which is assumed by the present inventors will be described. In addition, in this case, as a battery using the negative electrode active material of this embodiment, a lithium ion secondary battery will be described as an example. However, the battery using the negative electrode active material of this embodiment is not limited to a lithium ion secondary battery.

According to a widely used lithium ion secondary battery which performs charge/discharge using an intercalation reaction, Li is inserted into and released from an active material without changing the basic structure thereof (Formula (2)).

(charge/discharge reaction (intercalation reaction))

(2)

On the other hand, according to a lithium ion second battery which performs charge/discharge using a conversion reaction, an active material functioning as a host material not only provides a receiving site of lithium but can also be involved in a redox reaction (Formula (3)). Hence, the lithium ion secondary battery which performs charge/discharge using a conversion reaction can realize an increase in energy density as compared to that of the lithium ion secondary battery using an intercalation reaction.

(charge/discharge reaction (conversion reaction))

(3)

The battery reaction of the above formula (3) may be represented by the following formula (4).

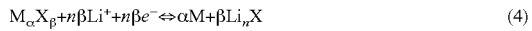

(4)

In addition, in the above formulas (2) to (4), M and X represent a transition metal and an anionic species, respectively. In addition, n represents an oxidized state of the anionic species.

The conversion reaction in charge/discharge of the negative electrode active material according to the first embodiment is represented by the following formula (5).

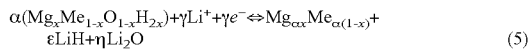

(5)

In the above formula (5), ε and η satisfy ε=γ−2α(1−x) and η=α(1−x), respectively.

In addition, when the battery is charged or discharged, the difference (electrochemical polarization) between the charging voltage and the discharging voltage is preferably decreased as small as possible. When the electrochemical polarization is small, since charge/discharge can be performed at a potential close to the standard electrode potential, the discharge capacity can be increased, and surplus energy in charge can be reduced. Hence, thermal damage to be done on the battery can be reduced, and the capacity can be increased. However, when a transition metal oxide and a transition metal fluoride are each used as the negative electrode active material, the electrochemical polarization is disadvantageously increased. In a lithium ion secondary battery using a conversion reaction, as one example of a method in which the electrochemical polarization is decreased and in which charge/discharge at a high rate is realized, a method in which the negative electrode active material is pulverized into fine particles may be mentioned. Accordingly, since the reaction overvoltage of the conversion reaction is decreased, a battery system having a small electrochemical polarization can be formed. In addition, because of the form of fine particles, reaction areas of a metal and a lithium salt are increased, and hence, an increase in charge/discharge capacity and an improvement in cycle characteristics can be realized.

As described above, in the compound represented by the composition formula (1), 0.5≤x≤0.9 is satisfied. In this case, a phenomenon in which an alloy reaction of MeH$_2$ occurs at approximately 0.1 V as a side reaction is not likely to be generated, and hence, the charge/discharge efficiency of the battery can be improved.

In addition, in the compound represented by the composition formula (1), 0.7≤x≤0.9 may also be satisfied. In the negative electrode active material of this embodiment, since the compound represented by the composition formula (1) satisfies 0.7≤x≤0.9, a battery having a higher capacity and a higher charge/discharge efficiency can be realized.

The negative electrode active material of this embodiment may contain the compound represented by the composition formula (1) as a primary component. According to the structure described above, the negative electrode active material of this embodiment can realize a battery having a higher capacity. In this case, the "negative electrode active material contains the compound represented by the composition formula (1) as a primary component" indicates that the negative electrode active material contains the compound represented by the composition formula (1) at a rate of 70 percent by mass or more. In addition, besides the compound represented by the composition formula (1) contained as a primary component, the negative electrode active material of this embodiment may further contain unavoidable impurities and/or raw materials used for the synthesis of the above compound, side products, and decomposed products. In addition, the negative electrode active material of this embodiment may be formed only from the compound represented by the composition formula (1).

In addition, in this embodiment, the "in the composition formula (1), Me is one element selected from the group consisting of Mn, Fe, Co, Ni, and Cu or a solid solution containing at least one selected from the group consisting of Mn, Fe, Co, Ni, and Cu" indicates that in other words, Me of the compound represented by the composition formula (1) may be any one of the following (a) to (c).

(a) An element selected from the group consisting of Mn, Fe, Co, Ni, and Cu.

(b) A solid solution formed of at least two elements selected from the group consisting of Mn, Fe, Co, Ni, and Cu.

(c) A solid solution formed of at least one element selected from the group consisting of Mn, Fe, Co, Ni, and Cu and at least one element other than the elements mentioned above.

Me of the compound represented by the composition formula (1) contained in the negative electrode active material of this embodiment may be a solid solution formed from Mn and Co, a solid solution formed from Mn and Ni, a solid solution formed from Mn and Cu, or a solid solution formed from Co and Ni. Since Me is one of the solid solutions described above, a battery having a higher capacity can be realized.

In view of the capacity density, the negative electrode active material of this embodiment may further contain silicon (Si), tin (Sn), a silicon compound, and/or a tin compound. The silicon compound and the tin compound each may be an alloy or a solid solution.

Next, one example of a method for manufacturing the above compound contained in the negative electrode active material of this embodiment will be described.

The compound represented by the composition formula (1) may be formed, for example, by the following method.

First, a raw material containing Me and a raw material containing $MgH_2$ are prepared. For example, as the raw material containing Me, an oxide, such as MeO (MnO, FeO, CoO, NiO, or CuO), having a low valence or a composite transition metal oxide containing at least one selected from the group consisting of Mn, Fe, Co, Ni, and Cu may be mentioned.

The raw material containing Me and the raw material containing $MgH_2$ are weighed to have the molar ratio represented by the composition formula (1). Accordingly, the value of "x" in the composition formula (1) is changed within the range shown by the composition formula (1), and hence, a desired value can be adjusted.

When the raw materials thus weighed are mixed together by a dry method or the like so as to perform a reaction for 10 hours or more in a mechanochemical manner, the compound represented by the composition formula (1) can be obtained. In order to perform a reaction in a mechanochemical manner, for example, a mixing device, such as a ball mill, may be used.

As described above, when the raw materials to be used and the mixing conditions of the raw material mixture are adjusted, the compound represented by the composition formula (1) can be obtained. That is, the compound represented by the composition formula (1) may be, for example, a finely pulverized compound which is composited from $MgH_2$ and MeO by a mechanochemical method.

The composition of the compound obtained by the above method may be determined, for example, by an induced coupled plasma (ICP) emission spectroscopic analysis and an inert gas fusion-infrared absorption method. In addition, when the space group of the crystal structure is determined by a powder X-ray analysis, the compound represented by the composition formula (1) can be identified.

As described above, one example of the method for manufacturing the compound represented by the composition formula (1) contained in the negative electrode active material of this embodiment includes a step (a) of preparing the raw materials and a step (b) of obtaining the compound represented by the composition formula (1) by a mechanochemical reaction of the raw materials. In addition, a method for manufacturing the negative electrode active material of this embodiment may also be a method including a step (a) of preparing raw materials of the compound represented by the composition formula (1) and a step (b) of obtaining the negative electrode active material by a mechanochemical reaction of the raw materials.

In this case, the above step (a) may further include, for example, a step of forming a composite oxide containing Me as a raw material by a known method. In addition, in the above step (b), a step of performing a reaction of the raw materials in a mechanochemical manner using a ball mill may also be included.

As described above, the compound represented by the composition formula (1) may be synthesized by a mechanochemical reaction of precursors (such as an oxide of $MgH_2$ and an oxide of Me) using a planetary ball mill.

In addition, when the above precursors are allowed to reach by a solid phase method, the precursors are each liable to be decomposed into a stabler compound. That is, for example, by a formation method in which the above precursors are allowed to react by a solid phase method, since hydrogen functioning as an anion is unstable and is not able to be stably located in the structure, the compound represented by the composition formula (1) may be difficult to obtain in some cases. Hence, in order to obtain the compound represented by the composition formula (1), a synthetic method in which the raw materials are allowed to react with each other in a mechanochemical manner is superior.

Second Embodiment

In a second embodiment, an embodiment of a battery according to the present disclosure will be described. In addition, explanations duplicated with those of the first embodiment will be appropriately omitted.

The battery of this embodiment includes a negative electrode, a positive electrode, and an electrolyte. In this case, the negative electrode includes the above negative electrode active material of the first embodiment. Accordingly, the battery of this embodiment can realize a high capacity and a high charge/discharge efficiency.

FIGURE is a cross-sectional view showing a schematic structure of a battery 10 which is one example of the battery of this embodiment. In this case, as the battery of this embodiment, a lithium ion secondary battery will be described by way of example.

As shown in FIGURE, the battery 10 includes a positive electrode 21, a negative electrode 22, a separator 14, a case 11, a sealing plate 15, and a gasket 18. The separator 14 is disposed between the positive electrode 21 and the negative electrode 22. A nonaqueous electrolyte (such as a nonaqueous electrolyte liquid) is impregnated in the positive electrode 21, the negative electrode 22, and the separator 14. By the positive electrode 21, the negative electrode 22, and the separator 14, an electrode group is formed. The electrode group is received in the case 11. By the gasket 18 and the sealing plate 15, the case 11 is sealed.

The negative electrode 22 includes a negative electrode active material layer 17 and a negative electrode collector 16. The negative electrode active material layer 17 is disposed between the negative electrode collector 16 and the separator 14.

The negative electrode active material layer 17 contains the negative electrode active material according to the first embodiment. Hence, the battery 10 can realize a high capacity and a high charge/discharge efficiency. The negative electrode active material layer 17 may contain the negative electrode active material according to the first embodiment as a primary component. In this case, the charge/discharge efficiency of the battery 10 is further improved. The rate in weight of the negative electrode active material to the negative electrode active material layer 17 may be 50 percent or more, 70 percent or more, or 90 percent or more. The negative electrode active material layer 17 may be substantially formed from the negative electrode active material. The "substantially formed from the negative electrode active material" indicates that other components which may change the intrinsic characteristics of the negative electrode active material are excluded. However, the negative electrode active material layer 17 may contain impurities besides the negative electrode active material.

If needed, the negative electrode active material layer 17 may further contain additives, such as an electrical conduction agent, an ion conduction auxiliary agent, and a binder.

The negative electrode collector 16 is formed, for example, of a metal material, such as aluminum, stainless steel, or an aluminum alloy. In addition, without using the negative electrode collector 16, the sealing plate 15 may also be used as a negative electrode collector.

In view of the capacity density, the negative electrode active material may further contain silicon (Si), tin (Sn), a silicon compound, and/or a tin compound. The silicon compound and the tin compound each maybe an alloy or a solid solution. As an example of the silicon compound, $SiO_y$, ($0.05<y<1.95$) may be mentioned. In addition, a compound (an alloy or a solid solution) in which silicon of $SiO_y$, is partially substituted by another element may also be used. In this case, as the another element, there may be mentioned at least one selected from the group consisting of boron, magnesium, nickel, titanium, molybdenum, cobalt, calcium, chromium, copper, iron, manganese, niobium, tantalum, vanadium, tungsten, zinc, carbon, nitrogen, and tin. As an example of the tin compound, for example, there may be mentioned $Ni_2Sn_4$, $Mg_2Sn$, $SnO_z$ ($0<z<2$), or $SnO_2$, or $SnSiO_3$. One tin compound selected from those mentioned above may be used alone, or at least two types thereof may be used in combination.

The positive electrode 21 includes a positive electrode collector 12 and a positive electrode active material layer 13 disposed thereon.

The positive electrode collector 12 is formed, for example, of a metal material, such as aluminum, stainless steel, or an aluminum alloy. In addition, without using the positive electrode collector 12, the case 11 may also be used as a positive electrode collector.

The positive electrode active material layer 13 contains a positive electrode active material. The positive electrode active material is not particularly limited, and for example, a known material, such as a lithium-containing metal oxide, as the positive electrode active material of a lithium ion secondary battery may be appropriately used.

As the binder contained in the positive electrode active material layer 13 and the negative electrode active material layer 17, for example, there may be used a poly(vinylidene fluoride), a polytetrafluoroethylene, a polyethylene, a polypropylene, an aramid resin, a polyamide, a polyimide, a poly(amide imide), a polyacrylonitrile, a poly(acrylic acid), a poly(methyl acrylate), a poly(ethyl acrylate), a poly(hexyl acrylate), a poly(methacrylic acid), a poly(methyl methacrylate), a poly(ethyl methacrylate), a poly(hexyl methacrylate), a poly(vinyl acetate), a poly(vinyl pyrrolidone), a polyether, a poly(ether sulfone), a hexafluoropolypropylene, a styrene-butadiene rubber, or a carboxymethyl cellulose. In addition, as the binder, for example, there may be used a copolymer formed from at least two selected from the group consisting of tetrafluoroethylene, hexafluoroethylene, hexafluoropropylene, a perfluoroalkyl vinyl ether, vinylidene fluoride, chlorotrifluoroethylene, ethylene, propylene, pentafluoropropylene, fluoromethyl vinyl ether, acrylic acid, and hexadiene. Furthermore, a mixture formed from at least two selected from the above materials may be used as the binder.

As the electrical conduction agent contained in the positive electrode active material layer 13 and the negative electrode active material layer 17, for example, there may be used graphite, carbon black, electrically conductive fibers, fluorinated graphite, a metal powder, electrically conductive whiskers, an electrically conductive metal oxide, or an organic electrically conductive material. As an example of the graphite, natural graphite and man-made graphite may be mentioned. As an example of the carbon black, acetylene black, Ketjen black (registered trade name), channel black, furnace black, lamp black, or thermal black. As an example of the metal powder, an aluminum powder may be mentioned. As an example of the electrically conductive whiskers, zinc oxide whickers or potassium titanate whiskers may be mentioned. As an example of the electrically conductive metal oxide, titanium oxide may be mentioned. As an example of the organic electrically conductive material, a phenylene derivative may be mentioned.

As the separator 14, a material having a high ion permeability and a sufficient mechanical strength may be used. As an example of the material described above, for example, a fine porous thin film, a woven cloth, or a non-woven cloth may be mentioned. In particular, the separator 14 may be formed from a polyolefin, such as a polypropylene or a polyethylene. The separator 14 formed from a polyolefin has not only an excellent durability but also a shutdown function when being excessively heated. The thickness of the separator 14 may be, for example, in a range of 10 to 300 μm or in a range of 10 to 40 μm. The separator 14 may be a single layer film formed from one material. Alternatively, the separator 14 may be a composite film or a multilayer film each formed from at least two types of materials. The porosity of the separator 14 may be, for example, in a range of 30% to 70% or in a range of 35% to 60%. The "porosity" indicates the rate of the volume of pores to the whole volume of the separator 14. The "porosity" is measured, for example, by a mercury intrusion method.

When the nonaqueous electrolyte liquid is impregnated in the positive electrode 21, the negative electrode 22, and the separator 14, the nonaqueous electrolyte liquid contains a nonaqueous solvent and a lithium salt dissolved therein.

As the nonaqueous solvent, for example, there may be used a cyclic carbonate ester solvent, a chain carbonate ester solvent, a cyclic ether solvent, a chain ether solvent, a cyclic ester solvent, a chain ester solvent, or a fluorine-containing solvent.

As an example of the cyclic carbonate ester solvent, for example, there may be mentioned ethylene carbonate, propylene carbonate, or butylene carbonate.

As an example of the chain carbonate ester solvent, for example, there may be mentioned dimethyl carbonate, ethyl methyl carbonate, or diethyl carbonate.

As an example of the cyclic ether solvent, for example, there may be mentioned tetrahydrofuran, 1,4-dioxane, or 1,3-dioxane.

As an example of the chain ether solvent, for example, there may be mentioned 1,2-dimethoxyethane or 1,2-diethoxyethane.

As an example of the cyclic ester solvent, for example, γ-butyrolactone may be mentioned.

As an example of the chain ester solvent, for example, methyl acetate may be mentioned.

As an example of the fluorine-containing solvent, for example, there may be mentioned fluoroethylene carbonate, methyl fluoropropionate, fluorobenzene, fluoroethyl methyl carbonate, or fluorodimethylene carbonate. When at least one of those fluorine-containing solvents is contained in the nonaqueous electrolyte liquid, oxidation resistance of the nonaqueous electrolyte liquid is improved. As a result, even when the battery 10 is charged at a high voltage, the battery 10 can be stably operated.

As the nonaqueous solvent, for example, one nonaqueous solvent selected from those solvents mentioned above by way of example may be used alone. Alternatively, as the nonaqueous solvent, at least two nonaqueous solvents selected from those solvents mentioned above by way of example may be used in combination.

As the lithium salt, for example, there may be used $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, or $LiC(SO_2CF_3)_3$. As the lithium salt, one lithium salt selected from those mentioned above may be used alone. Alternatively, as the lithium salt, a mixture of at least two types of those compounds mentioned above may be used. The concentration of the lithium salt may be, for example, in a range of 0.5 to 2 mol/liter.

In addition, the shape of the battery of this embodiment is not limited to that of the battery 10 shown in FIGURE, and various battery shapes, such as a coin shape, a cylindrical shape, a square shape, a sheet shape, a button shape, a flat shape, and a laminate shape may be formed.

The battery 10 of this embodiment may be used, for example, as a nonaqueous electrolyte secondary battery. The nonaqueous electrolyte secondary battery may be a lithium ion secondary battery.

A method for manufacturing the battery 10 is not particularly limited, and a known method may be used therefor.

EXAMPLES

Hereinafter, the present disclosure will be described in more detail with reference to examples. In addition, the following examples will be described by way of example, and the present disclosure is not limited thereto.

[Sample 1]

As raw material powders, $MgH_2$ and CoO were each weighed so that $MgH_2/CoO=9/1$ (molar ratio) was satisfied. The raw material powders thus obtained were received in a zirconia-made container having a volume of 45 cc together with an appropriate amount of zirconia-made balls having a diameter of 3 mm and were then sealed in a glove box in an Ar atmosphere at an oxygen value of 1 ppm or less. The raw material powders were recovered from the glove box and were then processed by a planetary ball mill at 600 rpm for 30 hours. As a result, a sample 1 of a negative electrode active material was obtained.

The sample 1 of the negative electrode active material, acetylene black functioning as an electrical conduction agent, and a poly(vinylidene fluoride) functioning as a binder were weighed at a mass ratio of 7:2:1 in a glove box in an Ar atmosphere at an oxygen value of 1 ppm or less. This mixture was dispersed in an N-methylpyrrolidone (NMP) solvent to form a slurry. The slurry thus formed was applied on a Cu collector using a coating device and was then dried, so that an electrode plate was obtained. The electrode plate thus obtained was rolled by a rolling machine and then punched out to have a square shape having a side length of 20 mm. The plate thus obtained was processed to have an electrode shape, so that a test electrode was obtained from the sample 1.

By the use of the test electrode using the sample 1, a lithium ion secondary battery in which lithium metal plates were used as a counter electrode and a reference electrode was formed as a test cell for evaluation. The preparation of an electrolyte liquid and the formation of the test cell were performed in a glove box in an Ar atmosphere at a dew point of −60° C. or less and an oxygen value of 1 ppm or less. As the electrolyte liquid, there was used a solution prepared by dissolving lithium hexafluorophosphate ($LiPF_6$) in a solvent containing ethylene carbonate and ethyl methyl carbonate at a volume ratio of 1:3 to have a concentration of 1 mol/liter. In addition, a lithium metal was pressure-bonded to a square nickel mesh having a side length of 20 mm. The metal thus processed was used as the counter electrode. The test electrode and the counter electrode were placed to face each other with a separator interposed therebetween, the separator being formed of a polyethylene fine porous film impregnated with the electrolyte liquid. Under the conditions as described above, the test electrode, the counter electrode, and the separator were placed in an outer package (the case 11 and the sealing plate 15 as shown in FIGURE) and were then sealed using the gasket 18. Accordingly, the test cell using the sample 1 was obtained.

[Samples 2 to 21]

Except for that the type of raw material powder MeO and/or the molar ratio of $MgH_2$ to MeO were changed as shown in Table 1, by the same method as that of the sample 1, samples 2 to 19 of negative electrode active materials were formed.

Except for that the raw material powder MeO was not used, by the same method as that of the sample 1, a sample 20 of a negative electrode active material was formed.

Except for that the raw material powder $MgH_2$ was not used, and the raw material powder MeO was MnO, by the same method as that of the sample 1, a sample 21 of a negative electrode active material was formed.

Except for that the samples 2 to 21 were each used instead of using the sample 1, by the same manufacturing method as that described above, the test electrodes and the test cells were formed.

[Charge/Discharge Test]

A charge/discharge test of the test cell formed from each of the samples 1 to 21 was performed, and the charge/discharge characteristics thereof were evaluated. The charge/discharge test of the test cell was performed in a temperature-controlled bath at 25° C. In the charge/discharge test, the test electrode was charged, and after a rest was taken for 20 minutes, the test electrode was discharged. An initial charge capacity, an initial discharge capacity, and a charge/discharge efficiency were evaluated by the following method.

At a constant current of 25 mA per weight of the negative electrode active material (that is, a constant current at a current density of 25 mA/g), charge was performed until the difference in potential with respect to the reference electrode reached 0 V, so that the initial charge capacity was obtained. Subsequently, at a constant current of 25 mA per weight of the negative electrode active material, discharge was performed until the difference in potential with respect to the reference electrode reached 2 V, so that the initial discharge capacity was obtained. By the use of the initial charge capacity and the initial discharge capacity thus obtained, the charge/discharge efficiency (initial discharge capacity/initial charge capacity) was obtained. The initial charge capacity, the initial discharge capacity, and the charge/discharge efficiency are shown in Table 1.

TABLE 1

| SAMPLE NO. | MOLAR RATIO OF RAW MATERIAL $MgH_2$ | MOLAR RATIO OF RAW MATERIAL MeO | RAW MATERIAL MeO | COMPOSITION | INITIAL CHARGE CAPACITY (mAh/g) | INITIAL DISCHARGE CAPACITY (mAh/g) | CHARGE/ DISCHARGE EFFICIENCY (%) | CLASS |
|---|---|---|---|---|---|---|---|---|
| 1 | 0.95 | 0.05 | CoO | $Mg_{0.95}Co_{0.05}O_{0.05}H_{1.9}$ | 1880 | 1015 | 54 | CE |
| 2 | 0.90 | 0.10 | CoO | $Mg_{0.9}Co_{0.1}O_{0.1}H_{1.8}$ | 1897 | 1138 | 60 | Ex |
| 3 | 0.85 | 0.15 | CoO | $Mg_{0.85}Co_{0.15}O_{0.15}H_{1.7}$ | 1920 | 1440 | 75 | Ex |
| 4 | 0.80 | 0.20 | CoO | $Mg_{0.8}Co_{0.2}O_{0.2}H_{1.6}$ | 2005 | 1564 | 78 | Ex |
| 5 | 0.70 | 0.30 | CoO | $Mg_{0.7}Co_{0.3}O_{0.3}H_{1.4}$ | 2020 | 1252 | 62 | Ex |
| 6 | 0.60 | 0.40 | CoO | $Mg_{0.6}Co_{0.4}O_{0.4}H_{1.2}$ | 1657 | 944 | 57 | Ex |
| 7 | 0.50 | 0.50 | CoO | $Mg_{0.5}Co_{0.5}O_{0.5}H_{1.0}$ | 1550 | 930 | 60 | Ex |
| 8 | 0.95 | 0.05 | MnO | $Mg_{0.95}Mn_{0.05}O_{0.05}H_{1.9}$ | 1875 | 1031 | 55 | CE |
| 9 | 0.80 | 0.20 | MnO | $Mg_{0.8}Mn_{0.2}O_{0.2}H_{1.6}$ | 1910 | 1184 | 62 | Ex |
| 10 | 0.60 | 0.40 | MnO | $Mg_{0.6}Mn_{0.4}O_{0.4}H_{1.2}$ | 1810 | 1050 | 58 | Ex |
| 11 | 0.95 | 0.05 | NiO | $Mg_{0.95}Ni_{0.05}O_{0.05}H_{1.9}$ | 1875 | 1013 | 54 | CE |
| 12 | 0.80 | 0.20 | NiO | $Mg_{0.8}Ni_{0.2}O_{0.2}H_{1.6}$ | 2010 | 1568 | 78 | Ex |
| 13 | 0.60 | 0.40 | NiO | $Mg_{0.6}Ni_{0.4}O_{0.4}H_{1.2}$ | 1805 | 1083 | 60 | Ex |
| 14 | 0.95 | 0.05 | FeO | $Mg_{0.95}Fe_{0.05}O_{0.05}H_{1.9}$ | 1888 | 1057 | 56 | CE |
| 15 | 0.80 | 0.20 | FeO | $Mg_{0.8}Fe_{0.2}O_{0.2}H_{1.6}$ | 1884 | 1093 | 58 | Ex |
| 16 | 0.60 | 0.40 | FeO | $Mg_{0.6}Fe_{0.4}O_{0.4}H_{1.2}$ | 1706 | 1280 | 75 | Ex |
| 17 | 0.95 | 0.05 | CuO | $Mg_{0.95}Cu_{0.05}O_{0.05}H_{1.9}$ | 1778 | 960 | 54 | CE |
| 18 | 0.80 | 0.20 | CuO | $Mg_{0.8}Cu_{0.2}O_{0.2}H_{1.6}$ | 1890 | 1096 | 58 | Ex |
| 19 | 0.60 | 0.40 | CuO | $Mg_{0.6}Cu_{0.4}O_{0.4}H_{1.2}$ | 1920 | 1152 | 60 | Ex |
| 20 | 1 | 0 | — | $MgH_2$ | 1874 | 956 | 51 | CE |
| 21 | 0 | 1 | MnO | MnO | 983 | 324 | 33 | CE |

According to the samples 2 to 7, 9, 10, 12, 13, 15, 16, 18, and 19 each of which was provided with the symbol "Ex" in Table 1, in the composition formula of $Mg_xMe_{1-x}O_{1-x}H_{2x}$, $0.5 \leq x \leq 0.9$ was satisfied. That is, those samples each correspond to the example of the negative electrode active material according to this embodiment. The samples 1, 8, 11, 14, 17, 20, and 21 provided with the symbol "CE" in Table 1 each correspond to a comparative example of the negative electrode active material.

As shown in Table 1, the tests cells in which the samples 1 to 19 were used as the negative electrode active materials each showed a high charge/discharge efficiency as compared to that of each of the test cells in which the samples 20 and 21 were used. In particular, the test cells using the sample in which $0.5 \leq x \leq 0.9$ was satisfied each showed a high charge/discharge efficiency as compared to that of the test cell using the sample in which the same MeO was used, and x=0.95 was satisfied. In particular, the test cells using the samples 2 to 7, 9, 10, 12, 13, 15, 16, 18, and 19 of the examples each showed a high charge/discharge efficiency as compared to that of each of the test cells using the samples 1, 8, 11, 14, and 17 of the comparative examples.

The test cells using the samples 3, 4, and 12 in which MeO was CoO or NiO, and $0.80 \leq x \leq 0.85$ was satisfied each showed a significantly high charge/discharge efficiency ($\geq 75\%$).

The test cells using the samples in which $0.7 \leq x \leq 0.9$ was satisfied each showed a large initial discharge capacity as compared to that of each of the test cells using the samples in which the same MeO was used, and x=0.95 was satisfied. In particular, the test cells using the samples 2 to 5, 9, 12, 15, and 18 of the examples each showed a large initial discharge capacity as compared to that of each of the test cells using the samples 1, 8, 11, 14, and 17 of the comparative examples.

The test cells using the samples in which MeO was CoO, MnO, NiO, or CuO, and $0.7 \leq x \leq 0.9$ was satisfied each showed a large initial charge capacity and a large initial discharge capacity as compared to those of each of the test cells using the samples in which the same MeO was used, and x=0.95 was satisfied. In particular, the test cells using the samples 2 to 5, 9, 12, and 18 of the examples each showed a large initial charge capacity and a large initial discharge capacity as compared to those of each of the test cells using the samples 1, 8, 11, and 17 of the comparative examples.

What is claimed is:

1. A negative electrode active material comprising:
    a compound represented by a composition formula of $Mg_xMe_{1-x}O_{1-x}H_{2x}$, where Me is at least one selected from the group consisting of Mn, Fe, Co, Ni, and Cu, and $0.5 \leq x \leq 0.9$.

2. The negative electrode active material according to claim 1, wherein $0.7 \leq x \leq 0.9$.

3. The negative electrode active material according to claim 2, wherein Me is one selected from the group consisting of Mn, Co, Ni, and Cu.

4. The negative electrode active material according to claim 3,
    wherein Me is Co or Ni, and
    $0.80 \leq x \leq 0.85$.

5. The negative electrode active material according to claim 1,
    wherein Me is at least one selected from the group consisting of Mn, Fe, and Cu.

6. A battery comprising:
    a negative electrode including the negative electrode active material according to claim 1;
    a positive electrode; and
    an electrolyte.

* * * * *